United States Patent [19]

Wroczynski

[11] Patent Number: 5,229,443
[45] Date of Patent: Jul. 20, 1993

[54] FLAME-RETARDANT POLYCARBONATE COMPOSITION

[75] Inventor: Ronald J. Wroczynski, Delmar, N.Y.

[73] Assignee: General Electric Company, Pittsfield, Mass.

[21] Appl. No.: 958,531

[22] Filed: Oct. 8, 1992

Related U.S. Application Data

[63] Continuation of Ser. No. 863,380, Apr. 3, 1992, abandoned, which is a continuation of Ser. No. 725,947, Jun. 27, 1991, abandoned, which is a continuation of Ser. No. 948,103, Dec. 31, 1986, abandoned.

[51] Int. Cl.$^5$ .................... C08K 5/15; C08L 73/00
[52] U.S. Cl. .................... 524/109; 524/114; 524/508; 524/537
[58] Field of Search .............. 524/109, 114, 508, 537

[56] References Cited

U.S. PATENT DOCUMENTS

| | | | |
|---|---|---|---|
| 3,334,154 | 8/1967 | Kim | 524/469 |
| 3,489,716 | 1/1970 | Calkins | 524/114 |
| 3,489,716 | 1/1970 | Calkins | 524/109 |
| 4,110,299 | 8/1978 | Mark | 524/84 |
| 4,438,231 | 3/1984 | Liu | 524/508 |
| 4,579,896 | 4/1986 | Rosenquist | 524/108 |
| 4,581,382 | 4/1986 | Liberti et al. | 524/114 |

*Primary Examiner*—Kriellion S. Morgan

[57] ABSTRACT

An improved flame-retardant composition comprises an aromatic carbonate polymer in admixture with a flame retardant amount of a compound containing aromatically bound bromine, which composition includes an epoxidized cycloaliphatic compound to retard dripping of flaming resin when articles molded from the composition are directly exposed to an open flame, especially after exposure to a humid atmosphere.

6 Claims, No Drawings

FLAME-RETARDANT POLYCARBONATE COMPOSITION

This is a continuation of copending application Ser. No. 07/863,380 filed on Apr. 3, 1992, now abandoned, which is a continuation of application Ser. No. 07/725,947 filed Jun. 27, 1991 now abandoned, which is a continuation of Ser. No. 06/948,103 filed Dec. 31, 1986, now abandoned.

This invention is directed to an improved flame-retardant polycarbonate composition of an aromatic polycarbonate polymer in admixture with a flame retardant amount of a compound containing aromatically bound bromine, the composition including an epoxidized cycloaliphatic compound to retard dripping of flaming resin when articles molded from the composition are directly exposed to an open flame, especially after conditioning in humid environments

BACKGROUND OF THE INVENTION

In Mark, U.S. Pat. No. 4,110,299, flame-retardant polycarbonate compositions are disclosed wherein the flame retardant comprises an organic monomeric or polymeric aromatic or heterocyclic halide. Also described are such compositions containing from 0.01 to 2.0 weight percent of a fluorinated polyolefin, e.g., poly(tetrafluoroethylene) to retard dripping flaming resin when articles molded from such compositions are exposed to an open flame. Although such compositions represent the current state of the art, dripping can still be a problem, especially in such impact modified compositions, particularly if the impact modifier is an acrylate polymer or copolymer, such as a copolymer of ethylene and ethyl acrylate.

Also showing the current state of the art is Rosenquist, U.S. Pat. No. 4,579,896, which discloses flame retardant and drip retardant polycarbonate compositions comprised of an aromatic carbonate resin, a flame retardant compound and a bis cyclic carbonate drip retardant.

In Calkins, U.S. Pat. No. 3,489,716 are disclosed aromatic polycarbonate resin compositions which do not include a flame retardant additive, but which are rendered color stable at elevated temperatures by adding 0.01 to 0.5 weight percent of an epoxidized cycloaliphatic compound. In Factor, U.S. Pat. No. 3,673,146, are disclosed color tinted polycarbonate compositions which do not increase in yellowness when remolded because they contain a small amount of a cycloaliphatic epoxy compound. In neither Calkins nor Factor is there any hint or suggestion that epoxidized cycloaliphatic compounds will function as drip-retarding agents in flame-retardant compositions.

It has now surprisingly been found that epoxidized cycloaliphatic compounds can be employed alone or together with other additives to render flame-retardant polycarbonate compositions free of any tendency after molding to drip flaming resins when exposed to an open flame, and exposure to humidity, and this discovery is the subject matter of the present invention.

SUMMARY OF THE INVENTION

In accordance with the present invention there are provided flame retardant aromatic polycarbonate compositions which do not drip flaming resin when exposed to an open flame, said compositions comprising:
(a) a polycarbonate resin of a dihydric phenol;
(b) an effective flame retardant amount of a compound containing aromatically bound bromine; and
(c) from 0.01 to 0.50 weight percent of an epoxidized cycloaliphatic compound containing:
   (i) 1-2 cycloaliphatic rings of six carbon atoms each, with at least one oxygen bridge being attached to adjacent carbon atoms in at least one cycloaliphatic ring;
   (ii) 6 to 30 carbon atoms; and
   (iii) only carbon, hydrogen and oxygen.

Also contemplated are compositions as defined above which also include
(d) an impact improving amount of an acrylate impact improver.

In preferred features polycarbonate resin (c) comprises poly(bisphenol-A carbonate); the compound containing aromatically bound bromine (b) comprises a copolycarbonate compound, i.e., carbonate copolymer comprised of units derived from tetrabromobisphenol-A and bisphenol-A, preferably in a mole ratio of the former to the latter of approximately from about 1:2.2 to about 1:3; and the epoxidized cycloaliphatic compound (c) comprises 3,4-epoxycyclohexylmethyl-3,4-epoxycyclohexane carboxylate.

DETAILED DESCRIPTION OF THE INVENTION

In the practice of this invention, any of the aromatic polycarbonates can be employed herein having a refractive index in the range of 1.54 to 1.65. These are homopolymers and copolymers and mixtures thereof that are prepared by reacting a dihydric phenol with a carbonate precursor. Typical of some of the dihydric phenols that may be employed in the practice of this invention are bisphenol-A, (2,2-bis(4-hydroxyphenyl) propane), bis(4-hydroxyphenyl) methane, 2,2-bis(4-hydroxy-3-methylphenyl) propane, 4,4-bis(4-hydroxyphenyl) heptane, and the like. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di(tolyl)carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone), etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-carbonate propyl ammonium bromide, tetramethylammonium chloride, tetramethyl ammonium hydroxide, tetra-n-butylammonium chloride, benzyltrimethylammonium chloride and quaternary phosphonium compounds such as, for example, n-butyltriphenyl phosphonium bromide and methyl-triphenyl phosphonium bromide.

Also, included herein are branched polycarbonates wherein a polyfunctional aromatic compounds is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellitic trichloride, 4-chloroformyl phthalic anhydride, pyromellitic acid, pyromellitic dianhydride, mellitic acid, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polycarbonate and a branched polycarbonate.

The organic bormines (b) are used in amounts of from 0.10 to about 10.0 parts per hundred parts of aromatic carbonate polymer.

Illustrative organic bromines include decabromodiphenyl phenyl ether; bis(pentabromophenoxy) ethane; decabromodiphenyl carbonate; and tetrabromo-BPA-polycarbonate "BPA" being bisphenol A.

Special mention is made of an aromatic carbonate copolymer, i.e., copolycarbonate in which from 25 to 75 wt. percent of the repeating units comprise bromo-substituted dihydric phenol units and the remainder of the repeating units comprise dihydric phenol, glycol or dicarboxylic acid units. The aromatic carbonate copolymers, i.e., copolycarbonate can be prepared by any of the well known methods which, for example, include reacting such materials as tetra-bromobisphenol-A, also known as 2,2-bis-(3,5-dibromo-4hydroxyphenyl)propane, e.g., ethylene glycol or propylene glycol or a dicarboxylic acid, e.g., adipic acid or isophthalic acid, but preferably a dihydric phenol such as bisphenol-A, also known as 2,2-bis(4-hydroxyphenyl)propane, with phosgene or a reactive derivative of phosgene.

Preferably, the carbonate copolymer modifier, i.e., copolycarbonate employed to provide the moldable flame-resistant polycarbonate resin-containing compositions of the present invention will be a copolymer prepared by reacting 75-25 wt. percent and preferably 40-30 wt. percent of tetra-bromobisphenol-A and correspondingly, 25-75 and preferably 60-70 wt. percent of another compound which may be either a dihydric phenol, a glycol or a dicarboxylic acid or mixtures thereof, said weights being based on the total weight of the copolymer. In addition, the aromatic carbonate copolymer, i.e., copolycarbonate should have an intrinsic viscosity of 0.2–0.7 deciliters/gram, as measured, for example, in p-dioxane at about 30° C. Typical examples of the other compounds which can be employed in place of the bisphenol-A component of the copolymer are other dihydric phenols such as hydroquinone, resorcinol, 2,2-bis(4-hydroxyphenyl)pentane, 2,4'-dihydroxydiphenylmethane, 2,6-dihydroxynaphthalene, bis-(4-hydroxyphenyl)sulfone, 4,4'-dihydroxydiphenyl ether, etc.; or glycols, such as ethylene glycol, propylene glycol, tetramethylethylene glycol, etc.; and also dicarboxylic acids such as adipic acid, isophthalic acid, sebacic acid, etc.; as well as mixtures of any of the above. However, the preferred copolymer component for use in the practice of this invention is a copolymer of about 35 wt. percent of tetrabromobisphenol-A and 65 wt. percent of bisphenol-A, respectively.

Component (c) herein is an epoxidized cycloaliphatic compound containing 1-2 cycloaliphatic rings of six carbon atoms each with at least one oxygen bridge being attached to adjacent carbon atoms in at least one cycloaliphatic ring. The amount of epoxidized cycloaliphatic compound employed herein can range anywhere from 0.01–0.50 weight percent based on the weight of the total composition.

In general, any of the epoxidized cycloaliphatic compounds having the above limitations can be employed in the practice of this invention. In place of the 3,4-epoxycyclohexylmethyl 3,4-epoxycyclohexane carboxylate used in the example, the following compounds produce essentially the same results, which compounds are: 3,4-epoxy-6-methylcyclohexylmethyl 3,4-epoxy-6-methylcyclohexane carboxylate, 2,3-epoxycyclohexylmethyl 3,4-epoxycyclohexane carboxylate, 4-(3,4-epoxy-5-methylcyclohexyl) butyl 3,4-epoxycyclohexane carboxylate, 3,4-epoxycyclohexylethylene oxide, di-3,4-epoxy-6-methylcyclohexyl-methyl adipate, cyclohexylmethyl 3,4-epoxycyclohexane carboxylate and 3,4-epoxy-6-methylcyclohexylmethyl 6-methylcyclohexyl carboxylate. In the practice of this invention the epoxidized cycloaliphatic compound can contain anywhere from 6 up to 30 carbon atoms. Preferably, however, in the practice of this invention, the preferred epoxidized cycloaliphatic compound is 3,4-epoxycyclohexylmethyl 3,4-epoxycyclohexane carboxylate.

As has been mentioned, component (d) can be used in conjunction with an organic polymer or polymers, for example, acrylate copolymers, such as olefin-alkyl acrylate or methacrylate copolymers containing a minor proportion of the acrylate or methacrylate, e.g., from 1 to 25 mol percent. Preferably, ethylene-ethyl acrylate copolymers will be used, such as those containing about 8 to 12% by weight of acrylate units. A typical commercial source is Dow Chemical Co. DPD 6169. Conventional amounts are used, e.g., 1 to 8 percent.

Other suitable acrylate polymers are acrylate-based core-shell multi-phase composite interpolymer resins. More particularly, the acrylate-based core-shell multi-phase composite interpolymer resin is a core-shell interpolymer comprising about 25 to 95/percent by weight of a first elastomeric phase and about 75 to 5 percent by weight of a final rigid thermoplastic shell phase. One or more intermediate phases are optional, for example, a middle stage polymerized from about 75 to 100 percent by weight styrene. An interpolymer of this type is commercially available under the tradename, ACRYLOID® KM 330, from Rohm & Haas Chemical Company. Also useful would be ACRYLOID® KM653 which has a polybutadiene core and acrylate shell.

The compositions of this invention are prepared by admixing the aromatic carbonate polymer with the organic halides (b) and the epoxidized cycloaliphatic compounds (c) and, optionally, impact modifier (d).

The compositions of the invention may also contain fillers, pigments, dyes, antioxidants, stabilizers, ultraviolet light absorbers, mold release agents and other additives commonly employed in non-opaque polycarbonates resin formulations. Furthermore, the shaped articles may be coated with, for example, mar- or scratch-resistant coatings.

DESCRIPTION OF THE PREFERRED EMBODIMENTS

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

GENERAL PROCEDURE

One hundred (100) parts of an aromatic polycarbonate, prepared by reacting 2,2-bis[4-hydroxyphenyl)propane and phosgene in the presence of an acid acceptor and a molecular weight regulator and having an intrinsic viscosity of 0.57 is mixed with the amounts of additives to be specified either singly or in combination by tumbling the ingredients together in a laboratory tumbler. The resulting mixture is then fed to an extruder, operated at about 280° C., and the extrudate is comminuted into pellets.

The pellets are then injection molded at about 275° C. into test bars of about 5 in. by ½ in. by about one-sixteenth in. thick. The test bars (5 for each additive listed in the Table) are subject to the test procedure set forth in Underwriters' Laboratories, Inc. Bulletin UL-94, Burning Test for Classifying Materials.

In this test, an open flame is applied to each specimen for 10 seconds, removed until all flaming or glowing ceases, then the flame is re-applied for an additional ten seconds. Thus each specimen receives two applications of the flame. That is 10 applications of flame will be applied for a total of 5 specimens.

In accordance with this test procedure, materials so investigated are rated either V-O, V-I or V-II based on the results of 5 specimens. The criteria for each V (for vertical) rating per UL-94 is briefly as follows:

"V-O": Average flaming and/or glowing after removal of the igniting flame shall not exceed 5 seconds and none of the specimens shall drip flaming particles which ignite absorbent cotton.

"V-I": Average flaming and/or glowing after removal of the igniting flame shall not travel vertically for more than one-eighth inch of the specimen after flaming ceases and glowing is incapable of igniting absorbent cotton.

"V-II": Average flame and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns". Further, UL-94 requires that all test bars in each test group must meet the V type rating to achieve the particular classification. Otherwise, the 5 bars receive the rating of the worst single bar. For example, if one bar is classified as V-II and the other four (4) are classified as V-O, then the rating for all 5 bars is V-II.

The results of the different additives within the scope of the instant invention are as follows with a control being the aromatic polycarbonate as prepared above without the additives of the type set forth herein.

DESCRIPTION OF THE PREFERRED EMBODIMENTS

The following examples illustrate the compositions of the present invention and provide data to show their advantages over the prior art. They are not intended to be construed to limit the claims in any manner whatsoever.

In the Examples and Tables that follow, the following abbreviations are used:

LEXAN—poly(bisphenol A carbonate)
TONE—polycaprolactone (plasticizer)
ERL—cycloaliphatic epoxy
STB—sodium trichlorobenzene sulfonate

EXAMPLES 1-2

Using the General Procedure hereinbefore described, materials were prepared and tested for flame retardancy. Compositions and test results are set forth in Table 1:

TABLE 1

| Flame Retardant Compositions | | | |
|---|---|---|---|
| | Example | | |
| | 1A* | 1 | 2 |
| Compositions (parts by weight) | | | |
| LEXAN ® 141-111$^a$ | 60 | 60 | 60 |
| LEXAN ® 145-111$^b$ | 15 | 15 | 15 |
| LEXAN ® 105B$^c$ | 25 | 25 | 25 |
| LEXAN ® R506$^d$ | 0.75 | 0.75 | 0.75 |
| TONE ® 300$^e$ | — | 7 | 7 |
| TONE ® 700 | 7 | — | — |
| STB$^f$ | 0.80 | 0.80 | 0.80 |
| ERL ® 4221$^g$ | — | 0.50 | 0.05 |
| Properties | | | |
| UL-94 Vertical Burn Test 1/16", | | | |

TABLE 1-continued

Flame Retardant Compositions

| | Example | | |
|---|---|---|---|
| | 1A* | 1 | 2 |
| 48 hrs @ 50% RH | | | |
| VO | Yes | Yes | Yes |
| Avg Flame-Out Time (FOT) (10 applications) | 16 | 20 | 14 |
| No. Drips/10 bars | 3 | 1 | 1 |
| No. Ignitions/10 bars | 0 | 0 | 0 |
| UL-94 Vertical Burn Test 1/16" 7 days @ 70° C. | | | |
| VO | Yes | Yes | Yes |
| Avg. FOT (10 applications) | — | 13 | 11 |
| No. Drips/5 bars | — | 0 | 0 |
| No. Ignitions/5 bars | — | 0 | 0 |

<sup>a</sup>LEXAN ® 141-111, poly(bisphenol-A carbonate), General Electric Company
<sup>b</sup>LEXAN ® 145-111, powder poly(bisphenol-A carbonate), General Electric Company
<sup>c</sup>LEXAN ® 105B, brominated polycarbonate flame retardant, General Electric Company
<sup>d</sup>LEXAN ® R506, General Electric Company
<sup>e</sup>TONE ® 300 and TONE ® 700, polycaprolactone, i.v.'s, 0.3 and 0.7 dl./g., Union Carbide Company
<sup>f</sup>STB, sodium trichlorobenzene sulfonate
<sup>g</sup>ERL 4221, 3,4-epoxycyclohexyl-3,4-epoxycyclohexane carboxylate, Union Carbide Company The above data indicate that when tested for flammability in the Underwriters Laboratories Vertical Burn Test UL-94, the composition self-extinguished in less than 10 seconds and did not drip flaming resin (rating V-O).

EXAMPLES 3-7

Using the General Procedure hereinbefore described, materials were prepared and tested for flame retardancy. Compositions and test results are set forth in Table 2:

TABLE 2

Flame Retardant Compositions

| | Example | | | | | |
|---|---|---|---|---|---|---|
| | 3A* | 3 | 4 | 5 | 6 | 7 |
| Compositions (parts by weight) | | | | | | |
| LEXAN ® 141-111 | 60 | 60 | 60 | 60 | 60 | 60 |
| LEXAN ® 145-111 | 15 | 15 | 15 | 15 | 15 | 15 |
| LEXAN ® 105B | 25 | 25 | 25 | 25 | 25 | 25 |
| LEXAN ® R506C | 0.75 | 0.75 | 0.75 | 0.75 | 0.75 | 0.75 |
| TONE ® 300 | 7 | 7 | 7 | 7 | 7 | 7 |
| STB | 0.80 | 0.80 | 0.80 | 0.80 | — | 0.80 |
| ERL ® 4221 | — | 0.20 | 0.10 | 0.05 | 0.05 | 0.05 |
| Properties | | | | | | |
| UL-94 Vertical Burn Test 1/16", 48 hrs @ 50% RH | | | | | | |
| VO | No | No | Yes | Yes | Yes | Yes |
| Avg Flame-Out Time (FOT) (10 appl) | 22 | 18 | 14 | 18 | 16 | 16 |
| No. Drips/10 bars | 5/5 | 3/6 | 1 | 2 | 4 | 2 |
| No. Ignitions/10 bars | 2/5 | 2/6 | 0 | 0 | 0 | 0 |

*Control

The above-mentioned patents, publication and test methods are incorporated herein by reference.

Many variations will suggest themselves to those skilling in the art in light of the above, detailed description. For example, other additives known to those skilled in the art may be added in conventional amounts to the flame retardant compositions herein including but without limitation, 20 weight percent reinforcing glass fibers, 40 weight percent of poly(1,4-butylene terephthalate), 20 weight percent of talc or mica, and the like.

All such obvious variations are within the full intended scope of the appended claims without departing from the spirit of the invention.

I claim:

1. A method for rendering flame retardant polycarbonate compositions substantially free of the tendency to drip flaming resin when exposed to an open flame, comprising: admixing
   (a) a polycarbonate resin of a dihydric phenol;
   (b) an effective flame retardant amount of a compound containing aromatically bound bormine; and
   (c) from 0.01 to 0.50 weight percent of an epoxidized cycloaliphatic compound containing:
      (i) 1 α 2 cycloaliphatic rings of six carbon atoms each, with at least one oxygen bridge being attached to adjacent carbon atoms in at least one cycloaliphatic ring,
      (ii) 6 to 30 carbon atoms, and
      (iii) only carbon, hydrogen and oxygen.

2. The process of claim 1, further comprising admixing an impact improving amount of an acrylate impact improver.

3. The process of claim 1, wherein said polycarbonate resin of a dihydric phenol is poly(bisphenol-A carbonate).

4. The process of claim 1, wherein said compound containing aromatically bound bromine is a copolycarbonate comprised of units derived from tetrabromobisphanol-A and bisphenol A.

5. The process of claim 4, wherein the mole ratio of tetrabromobisphanol-A to bisphenol-A is about 1:2.2 to 3.

6. The process of claim 1, wherein the epoxidized cycloaliphatic compound is 3,4-epoxycyclohexylmethyl 3,4-epoxycyclohexane carboxylate.

* * * * *